US011588508B2

(12) United States Patent
McKenzie et al.

(10) Patent No.: US 11,588,508 B2
(45) Date of Patent: Feb. 21, 2023

(54) MONITORING CELL PHONE USAGE IN CORRECTIONAL FACILITIES

(71) Applicant: SIGNALENCE, INC., Pittsburgh, PA (US)

(72) Inventors: John Samuel McKenzie, Aurora, OH (US); James Edward Szpak, Cleveland Heights, OH (US); Carl Roy Stevens, Akron, OH (US)

(73) Assignee: Signalence, Inc., Pittsburgh, PA (US)

( * ) Notice: Subject to any disclaimer, the term of this patent is extended or adjusted under 35 U.S.C. 154(b) by 0 days.

(21) Appl. No.: 15/941,990

(22) Filed: Mar. 30, 2018

(65) Prior Publication Data

US 2018/0287643 A1 Oct. 4, 2018

Related U.S. Application Data

(60) Provisional application No. 62/478,847, filed on Mar. 30, 2017.

(51) Int. Cl.
| | | |
|---|---|---|
| *H04B 1/04* | (2006.01) | |
| *H04M 3/22* | (2006.01) | |
| *H04B 1/3888* | (2015.01) | |
| *H04W 84/18* | (2009.01) | |
| *H04W 8/00* | (2009.01) | |

(52) U.S. Cl.
CPC ......... *H04B 1/0483* (2013.01); *H04B 1/3888* (2013.01); *H04M 3/2281* (2013.01); *H04M 2207/18* (2013.01); *H04W 8/005* (2013.01); *H04W 84/18* (2013.01)

(58) Field of Classification Search
CPC . H04B 1/0483; H04B 1/3888; H04M 3/2281; H04M 2207/18; H04W 84/18; H04W 8/005
See application file for complete search history.

(56) References Cited

U.S. PATENT DOCUMENTS

| | | |
|---|---|---|
| 6,496,703 B1 | 12/2002 | da Silva |
| 6,580,372 B1 | 6/2003 | Harris |
| 7,015,817 B2 | 3/2006 | Copley et al. |
| 7,142,877 B2 | 11/2006 | Lipovski |
| 7,916,845 B2 | 3/2011 | Rae et al. |
| 7,953,216 B2 | 5/2011 | Profanchick, Sr. |
| 8,019,354 B2 | 9/2011 | Rae et al. |
| 8,099,080 B1 | 1/2012 | Rae et al. |
| 8,103,293 B2 | 1/2012 | Olbers et al. |
| 8,175,577 B1 | 5/2012 | Harvey et al. |

(Continued)

FOREIGN PATENT DOCUMENTS

WO 2015097188 A1 7/2015

OTHER PUBLICATIONS

International Search Report and Written Opinion for PCT/US2018/025505 dated Jul. 20, 2018.

(Continued)

*Primary Examiner* — Nguyen T Vo (74) *Attorney, Agent, or Firm* — DLA Piper LLP (57) ABSTRACT

Disclose herein are embodiments related to a system made up of a lighting fixture and a radio frequency detection device. The lighting fixture having a secure housing and at least one power connection, and the radio frequency detection device being designed to operatively connect to the at least one power connection device within the lighting fixture.

18 Claims, 10 Drawing Sheets

(56) References Cited

U.S. PATENT DOCUMENTS

| | | |
|---|---|---|
| 8,224,233 B2 | 7/2012 | Brisebois et al. |
| 8,233,880 B2 | 7/2012 | Johnson |
| 8,315,367 B2 | 11/2012 | Profanchick, Sr. |
| 8,351,961 B2 | 1/2013 | Olbers et al. |
| 8,384,555 B2 | 2/2013 | Rosen |
| 8,478,234 B1 | 7/2013 | Byrne |
| 8,532,616 B2 | 9/2013 | Nelkenbaum |
| 8,606,229 B2 | 12/2013 | Johnson |
| 8,750,903 B1 | 6/2014 | Fitzsimmons et al. |
| 8,941,486 B1 | 1/2015 | Forde et al. |
| 8,981,925 B2 | 3/2015 | Chapin et al. |
| 8,996,028 B2 | 3/2015 | Noonan et al. |
| 9,237,422 B1 | 1/2016 | Bhat et al. |
| 9,271,145 B2 | 2/2016 | Byrne |
| 9,443,361 B2 | 9/2016 | Profanchik |
| 9,444,574 B2 | 9/2016 | Johnson |
| 9,473,497 B1 | 10/2016 | Smith |
| 9,900,428 B1* | 2/2018 | Hodge ................. H04W 24/10 |
| 2001/0036821 A1* | 11/2001 | Gainsboro .......... H04M 3/2281 |
| | | 455/410 |
| 2007/0086198 A1* | 4/2007 | Wilson .................... F21V 3/00 |
| | | 362/382 |
| 2007/0258508 A1* | 11/2007 | Werb ................... H04L 9/3247 |
| | | 375/140 |
| 2008/0043993 A1* | 2/2008 | Johnson ................ H04M 11/04 |
| | | 379/386 |
| 2008/0057976 A1* | 3/2008 | Rae ..................... H04W 64/003 |
| | | 455/456.1 |
| 2010/0141153 A1* | 6/2010 | Recker ............... H05B 33/0803 |
| | | 315/149 |
| 2011/0086614 A1* | 4/2011 | Brisebois ............. H04W 12/08 |
| | | 455/411 |
| 2012/0280793 A1* | 11/2012 | Fayfield ................. G08G 1/142 |
| | | 340/8.1 |
| 2012/0295646 A1 | 11/2012 | Johnson |
| 2014/0004817 A1 | 1/2014 | Horton et al. |
| 2014/0194084 A1 | 7/2014 | Noonan et al. |
| 2016/0121951 A1* | 5/2016 | Lippman ................. B62H 5/20 |
| | | 340/427 |
| 2016/0232761 A1* | 8/2016 | Prasanna ........... G08B 13/1654 |
| 2017/0048952 A1* | 2/2017 | Roberts ............. H05B 37/0272 |
| 2017/0111980 A1* | 4/2017 | B Tai ................. H05B 37/0272 |
| 2017/0171754 A1* | 6/2017 | South ..................... H04W 4/90 |
| 2018/0066833 A1* | 3/2018 | Draaijer ................ H01F 38/14 |
| 2018/0172243 A1* | 6/2018 | Clynne .................... F21S 8/08 |

OTHER PUBLICATIONS

European Supplemental Search Report and Written Opinion for EP18775562.4 dated Sep. 3, 2020.

* cited by examiner

MONITORING CELL PHONE USAGE IN CORRECTIONAL FACILITIES

CROSS-REFERENCED TO RELATED APPLICATIONS

The present application claims benefit of priority under 35 U.S.C. 119(e) to the filing date of U.S. Provisional Patent Application 62/478,847 filed Mar. 30, 2017, entitled, "MONITORING CELL PHONE USAGE IN CORRECTIONAL FACILITIES" the contents of which is incorporated herein by reference in their entirety.

BACKGROUND

Although prison officials have long battled illegal cell phones, the introduction of smartphones has upped the ante with regard to criminal activity within a correctional facility. Because smartphone typically provide Internet access, an inmate can gain access to phone directories, maps, and/or photographs for criminal purposes. Gang violence and drug trafficking are increasingly being orchestrated online, allowing inmates to keep up criminal behavior even as they serve time.

Cell phones are prohibited in all state and federal prisons in the United States, often even for top corrections officials. Punishment for an inmate found with one varies. In some states, it is an infraction that affects parole or time off for good behavior. In others, it results in new criminal charges. President Obama signed a law making possession of a phone or a wireless device in a federal prison a felony, punishable by up to a year of extra sentencing. However, cell phones are still prevalent in correctional facilities. In the first four months of 2010, Federal Bureau of Prisons workers confiscated 1,188 cell phones.

Various solutions have been proposed to slow or stop the use of cell phones in correctional facilities. One such solution is to jam cell phone signals in prisons. In fact, prison officials have petitioned the Federal Communications Commission (FCC) for permission to install technology that would render cell phones useless. However, the Communications Act of 1934, prohibits the blocking of radio signals, or, in this case, cell phone signals from authorized users. Thus, if a cell phone jamming system were to inadvertently prevent the use of a legal cell phone nearby the system would violate federal law. Accordingly, a solution is needed that can address the use of cell phones (e.g., smart phones) within a correctional facility while not restricting the authorized use of radio signals, and thus operating within legal guidelines.

SUMMARY

In one embodiment, a system is disclosed including: a lighting fixture having a secure housing; and at least one power connection. Further disclosed is a radio frequency detection device having at least one processor; and at least one a computer readable storage medium. The radio frequency device is operatively connected to the at least one power connection device; and wherein the radio frequency device is within the securing housing.

In a further embodiment, a radio frequency detection device is disclosed including: at least one processor; and at least one a computer readable storage medium. The radio frequency device being configured to connect to at least one power connection device within a securing housing.

BRIEF DESCRIPTION OF THE DRAWINGS

For illustrating some embodiments of the disclosure, there is shown in the drawings various embodiments; it being understood, however, that the disclosure is not limited to the specific instrumentalities disclosed as they are used for illustrative purposes only. Included in the drawings are the following Figures.

DETAILED DESCRIPTION

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

As discussed herein, the use of cellular phones (e.g., smartphones) in correctional facilities (i.e., prisons) presents a major issue because inmates can use the smartphones to coordinate with other inmates in order to carry out illegal and/or dangerous acts. Additionally, inmates can coordinate with individuals outside of the prison to continue running an illegal organization from within the prison, or potentially smuggle contraband into the prison. Thus, a system is needed that can accurately monitor and alert prison staff (e.g., correctional officers) quickly and efficiently when a cell phone is used within a prison. Moreover, the system needs to be able to identify the general location within the prison that the activity took place, the specific time the activity took place, and be able to detect if a portion of the system is non-operational or compromised.

Thus, embodiments, as disclosed herein relate to a system and method for tracking cell phone use and determining the location and time of the cell phone use. In some embodiments, a plurality of sensing devices may be placed throughout a correctional facility which can detect cell phone activity. In one non-limiting example, multiple radio frequency (RF) detectors may be placed around a correctional facility to detect if/when a cell phone is used within proximity of the RF detector. In some embodiments, the RF detector may include but is not limited to, a low power RF wake up circuit, a CPU, non-volatile memory (e.g., electrically erasable programmable read-only memory (EEPROM), flash memory, ferroelectric random access memory (F-RAM), magnetoresistive random access memory (MRAM), etc.), a real time clock, a wireless transceiver (i.e., antenna), and a backup battery.

The exact materials comprising the RF detector circuit may vary based on the desired functionally of the RF detector, as discussed herein. For example, in some embodiments, the RF detector may provide bi-directional wireless communication, allowing them to form a mesh network. When in a mesh network topology, each RF detector device may relay data across the entire network as all of the nodes (e.g., RF detector devices) cooperate in the distribution of data in the network.

Generally, mesh networks relay messages using either a flooding technique or a routing technique. Some embodiments discussed herein may utilize the routing technique wherein the message is propagated along a path by hopping from node to node until it reaches its destination. In one or more embodiments, discussed herein, the flooding technique may be utilized. Flooding in wireless mesh networks involves distributing some data from one node to rest of the nodes in the network. To ensure a selected route or flood process is functional and available, the mesh network must allow for continuous connections and be able to reconfigure itself automatically around broken paths. Thus, in some embodiments, the RF detectors may have self-healing algorithms (e.g., Shortest Path Bridging (SPB) IEEE802.1aq) stored on a memory device. Using the self-healing algorithms, the mesh network is still able to operate when a node breaks down or when a connection becomes unreliable due to, for example, inmate tampering.

In additional embodiments, the RF detectors may broadcast a "heart beat" signal. This broadcast signal can be utilized to determine whether an RF detector has been tampered with or disabled in any way. By way of specific example, the one or more RF detectors discussed herein may broadcast an all clear signal at a particular interval, where the interval may be from about one (1) second to about eight (8) hours. In additional embodiments, the signal strength of the RF detector may be monitored over time and compared to a historic value. Thus, embodiments may be able to analyze the historical data and determine if tampering was attempted or if there was a temporary signal loss.

Although the mesh network, as discussed herein can transmit information and data across itself, a system for informing and displaying the results to corrections officers would still be useful. In some embodiments, correctional officers may carry mobile devices (e.g., smartphones, tablets, pagers, PDAs, etc.) that are connected to the mesh network. Thus, if one or more RF detectors identifies the use of a cell phone, the corrections officer(s) may be notified via their mobile device. In further embodiments, the mesh network may identify one or more corrections officers that is within the closest proximity to the detected cell phone activity and alert the one or more officers of the activity. Additionally or alternatively, the mesh network may push notifications out to every available mobile device informing them of the unauthorized cell phone activity.

In other embodiments, a central command station (e.g., server, computing, information handling device, etc.) may be utilized to monitor potential cell phone usage throughout the correctional facility. Thus, regardless of the cell phone usage location, the mesh network may route the information (e.g., time stamp, location, device type, signal duration, signal strength, IMEI or other identifying information of the mobile device or SIM card, prisoner name, prisoner identification number, battery status, power status, etc.) to the central monitoring station where one or more correctional officers may be monitoring the system. Regardless of the notification method (e.g., central command station v. mobile devices), the information collected and sent as notification data may be similar in nature.

The present disclosure provides systems, methods, and/or computer program products. The computer program product may include a computer readable storage medium (or media) having computer readable program instructions thereon for causing a processor to carry out aspects of the present disclosure.

The computer readable storage medium can be a non-transitory tangible device that can retain and store instructions for use by an instruction execution device (e.g., one or more processors). The computer readable storage medium may be, for example, but is not limited to, an electronic, magnetic, optical, electromagnetic, or semiconductor storage device, or any suitable combination of the foregoing. A non-exhaustive list of more specific examples of the computer readable storage medium includes the following: a portable computer diskette, a hard disk, random access memory (RAM), read-only memory (ROM), erasable programmable read-only memory (EPROM or Flash memory), static random access memory (SRAM), a compact disc read-only memory (CD-ROM), a digital versatile disk (DVD), a memory stick, a floppy disk, a mechanically encoded device such as punch-card(s) or raised structures in a groove having instructions recorded thereon, and/or any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium, or to an external computer, or external storage device via a network, for example, the Internet, a local area network (LAN), a wide area network (WAN) and/or a wireless network. The network may comprise conductive transmission cables (e.g., copper cables), optical transmission fibers, wireless transmission, routers, firewalls, switches, gateway computers, and/or edge servers. A network adapter card or network interface in each computing/processing device receives computer readable program instructions from the network and forwards the computer readable program instructions, for storage in a computer readable storage medium, within the respective computing/processing device.

The illustrated example embodiments will be best understood by reference to the figures. The following description is intended only by way of example and simply provides certain illustrative embodiments.

Figure 1:
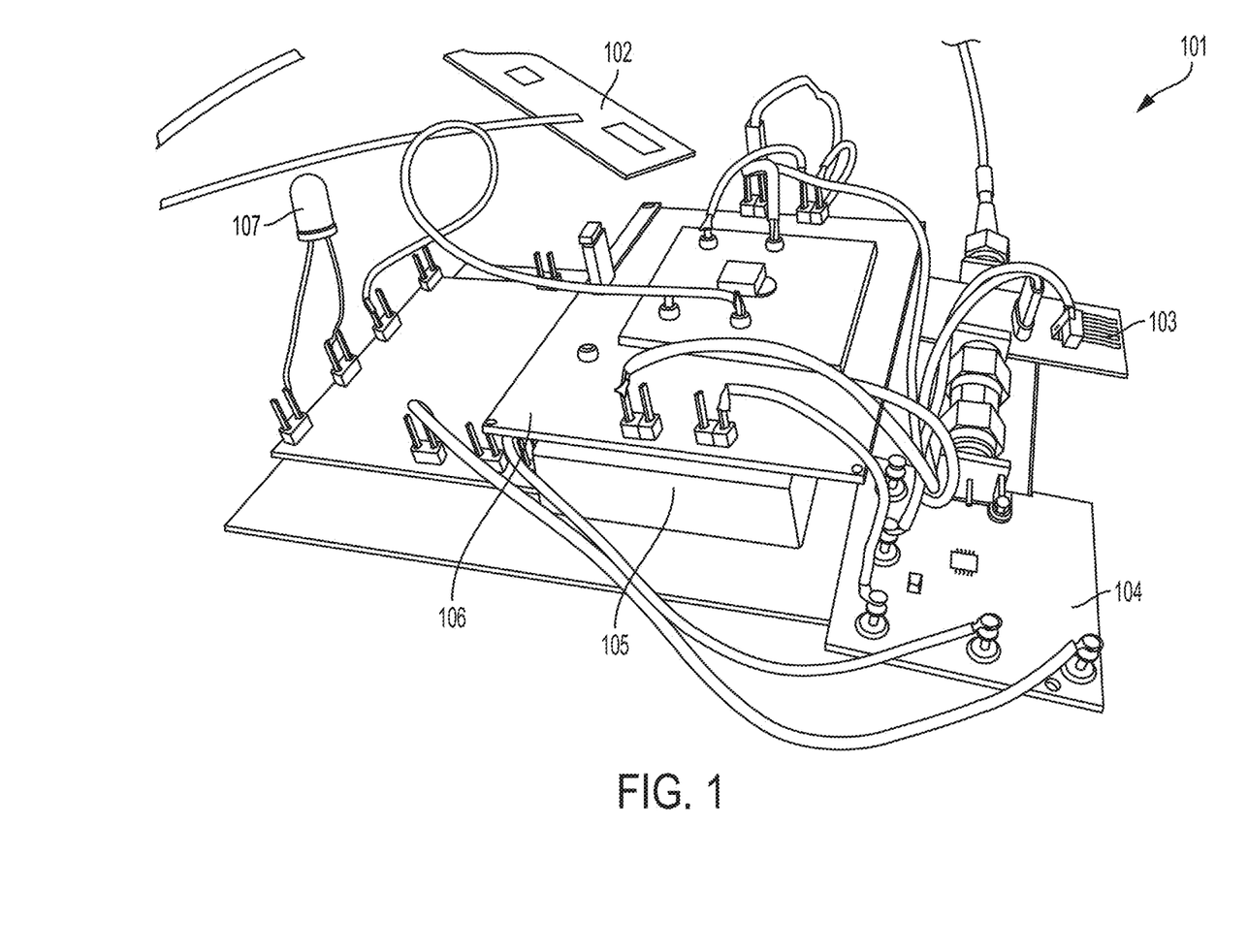
FIG. 1 depicts an example of a radio frequency detector.

Referring now to FIG. 1, an example RF detector 101 is shown. In some embodiments, the RF detector 101 may be designed to be compact and easily deployable. As discussed herein, the RF detector 101 may comprise one or more antenna 102, an RF amplifier circuit 103, an RF signal power detector circuit 104, a battery 105, a power supply 106, and a light emitting diode (LED) visual indicator 107.

As discussed herein, in some embodiments, RF detectors 101 may be located throughout the correctional facility. Because the RF detectors 101 comprise electronic components, a power supply is required. In certain embodiments, a battery pack may be included with the RF detector 101 in order to supply power and/or backup power during a power outage. As discussed herein, it is important to monitor and detect potential tampering, it is similarly important to increase the robustness of the system (e.g., providing a battery back). However, in an alternative embodiment, power may be supplied via an external power source (e.g., 120/220 VAC power system, DC power supply, DC transformer, etc.).

Figure 2:
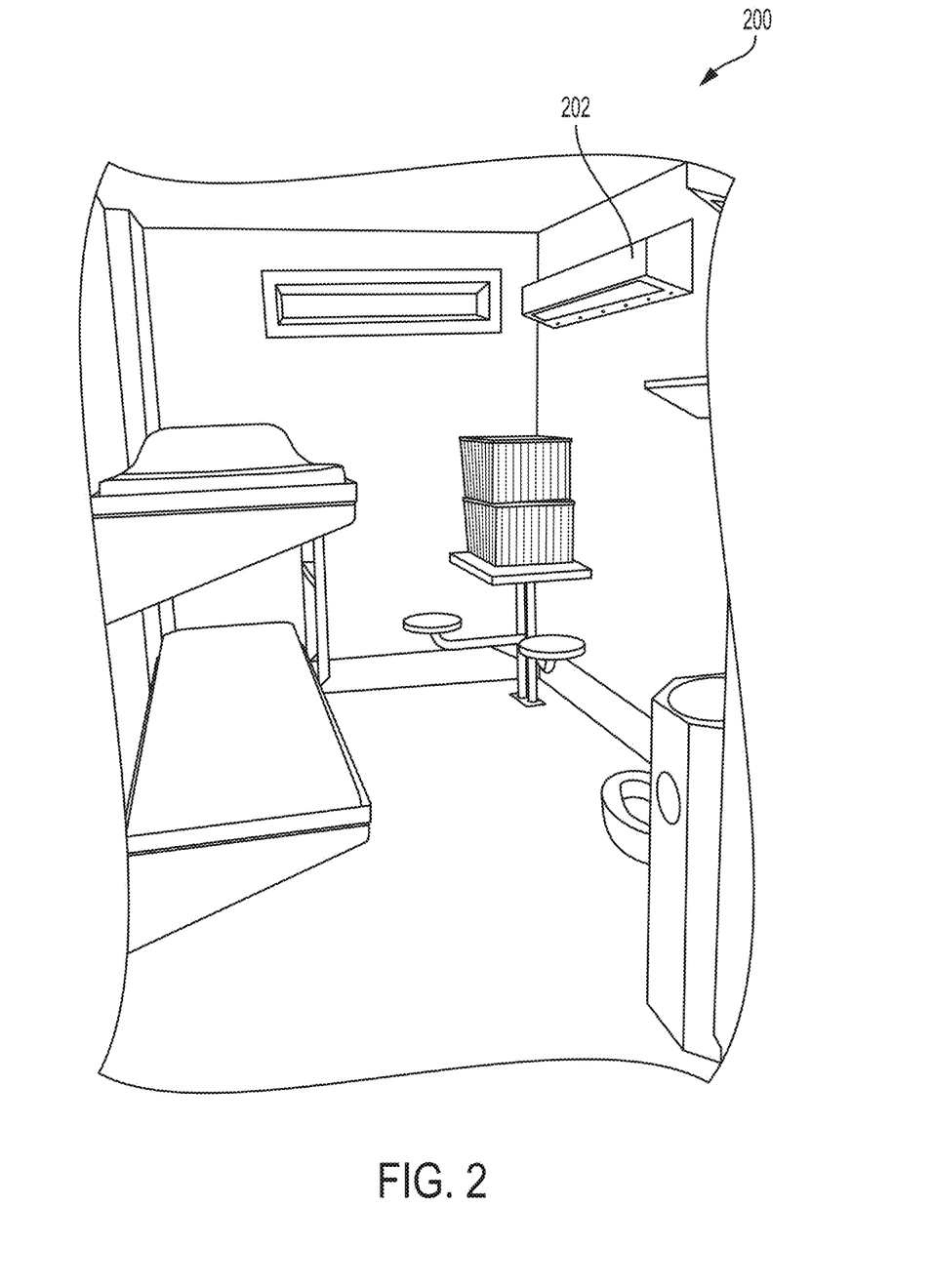
FIG. 2 depicts an example of a holding cell with an illumination device.

In order to easily supply external power, some embodiments my utilize existing infrastructure within the correctional facility. Referring briefly to FIG. 2, an example inmate holding cell 200 is shown. Generally, most holding cells 200 contain some form of illumination device (e.g., wall mounted light, ceiling mounted light, etc.) 202. As would be expected, lighting fixtures in holding cells are secure devices. The light fixture needs to be secure to prevent inmates from tampering with them. Additionally, the illumination device 202 is highly likely to have an external power source provided to it to power the light within the housing. In some embodiments, existing quick connect "push-in" within the light fixture 202 may be utilized to power the RF detector.

Figure 3:
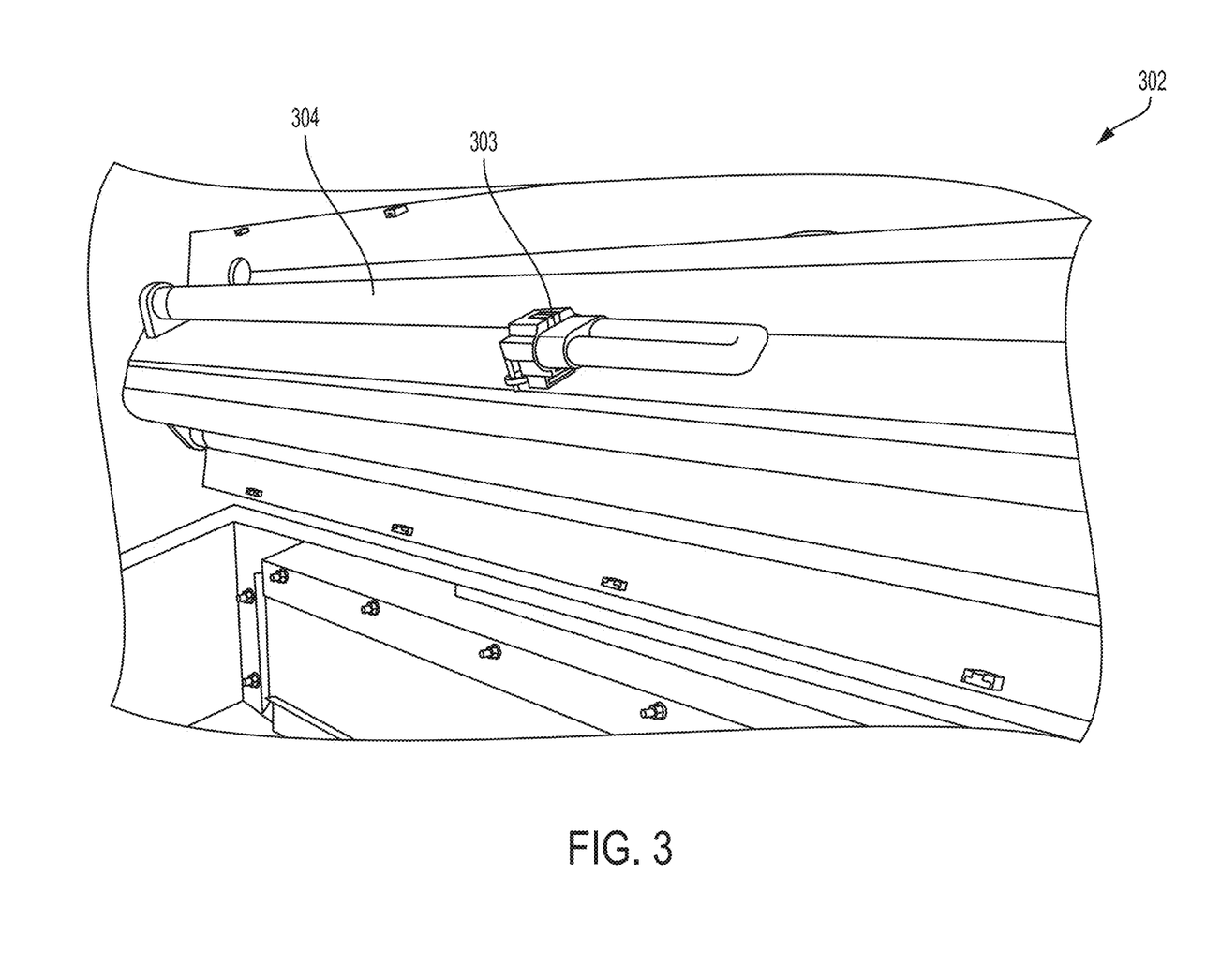
FIG. 3 depicts an internal view of an illustrative illumination device.

A specific non-limiting example of an illumination device 302 is shown in FIG. 3. In some embodiments, and as shown, an illumination device 302 may comprise an additional "night light" light source 303 in addition to the general light sources 304. Thus, in some embodiments, it may be possible to utilize the power provided to one or more light sources (e.g., 303 and 304) to power an RF detector 101. This not only provides an easily accessible power source, but also a secure housing within which to place the RF detector 101. In additional embodiments, the RF detector 101 may utilized power from two separate sources to ensure continued operation. By way of specific example, some general light sources 304 and/or some night lights sources 303, may be connected to a separate power system (e.g., an emergency backup system). This may be because certain system are supported via a backup generator, or are on a more grounded circuit.

Figure 4A:
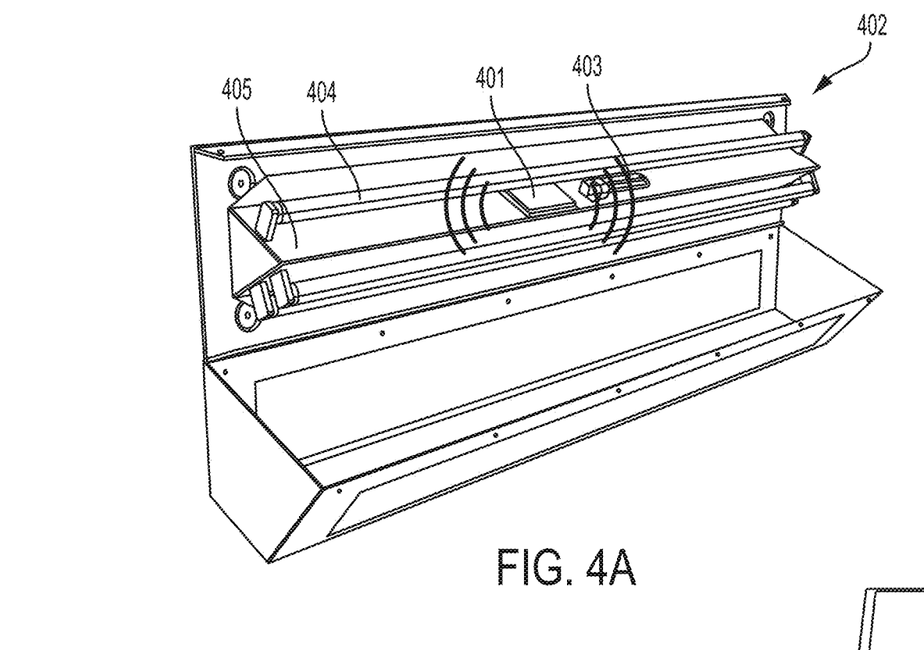
FIG. 4A depicts another internal view of an illustrative illumination device.
Figure 4B:
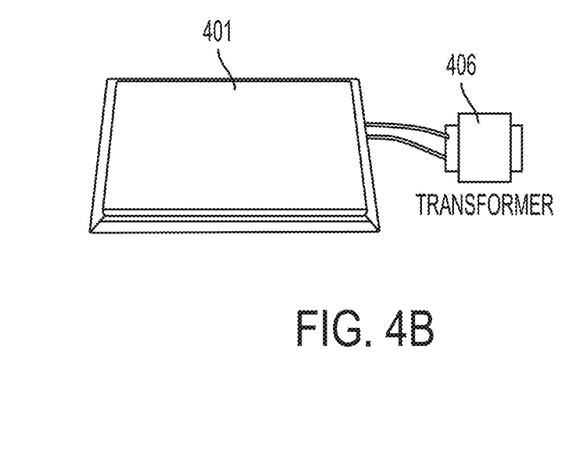
FIG. 4B depicts an illustrative radio frequency detector and a step transformer.

In some embodiments, such as that shown in FIG. 4, the RF detector 401 may be mounted on an internal surface 405 within the secure illumination device 402. Thus, not only will the RF detector 401 have easy access to an external power source (i.e., the power supplied for the one or more light sources) it will also be contained within a secure structure (i.e., the illumination device 402). In further embodiments, the RF detector 401 may use a transformer 406 to receive the proper voltage and power type (e.g., alternating current or direct current). It should be understood that, in some embodiments, the transformer 406 may be part of the illumination device 402, and in alternative embodiments, the transformer 406 may be provided during the installation of the RF detector 401.

Figure 5:
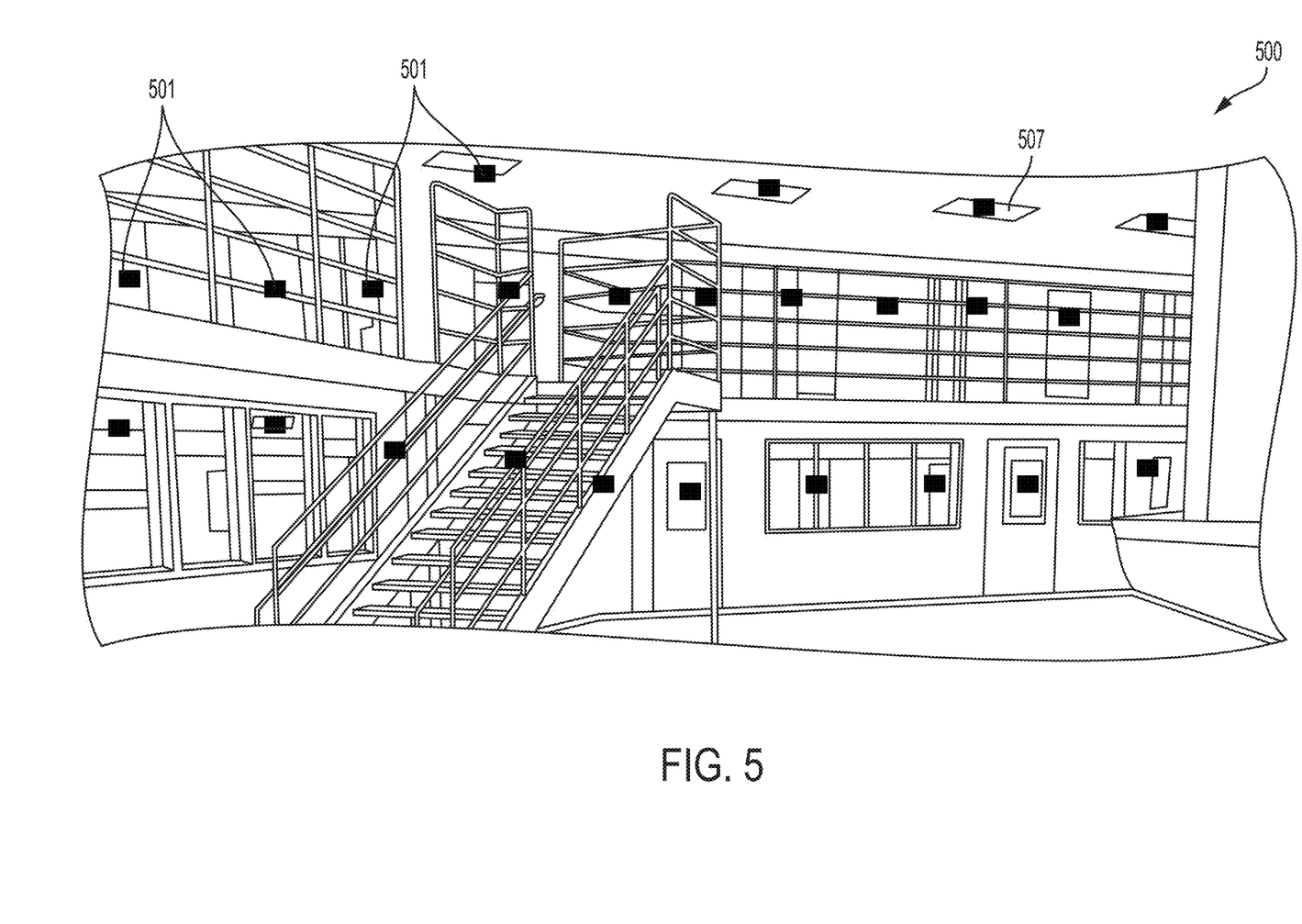
FIG. 5 depicts an illustrative mesh network of radio frequency detectors placed in existing illumination devices.

Referring to FIG. 5, an example embodiment of the mesh network 500 is shown where a plurality of RF detectors 501 are placed within existing light figures. Due to the large number of existing light fixtures, the number of RF detectors can be high enough to maintain a proper working mesh network 500. It should be understood by one skilled in the art that although specific examples have been given herein involving the RF detector being located within a illumination device designed for a holding cell, the RF detector may be located within any secure illumination device (not shown) or any inaccessible illumination device (e.g., an illumination device out of the reach of inmates such as 507).

Accordingly, embodiments are disclosed herein, where an RF detector may tap into a main power system (120 VAC/220 VAC, etc.) of a correctional facility via a plurality of light fixtures rather than utilizing any specific or additional power source. Additionally, embodiments may utilize the highly durable and tamper-proof environment (e.g., steel housing) that is typically used for correctional facility lighting systems. In embodiments described herein, the glass/plastic lens of the illumination device provides a large window for RF signals to be received at the RF detector. Once detected, a notification, including specific characteristics about the signal detection, may be transmitted to a user device (e.g., a base station or a mobile device) or adjacent RF detectors on a mesh network.

Figure 6:
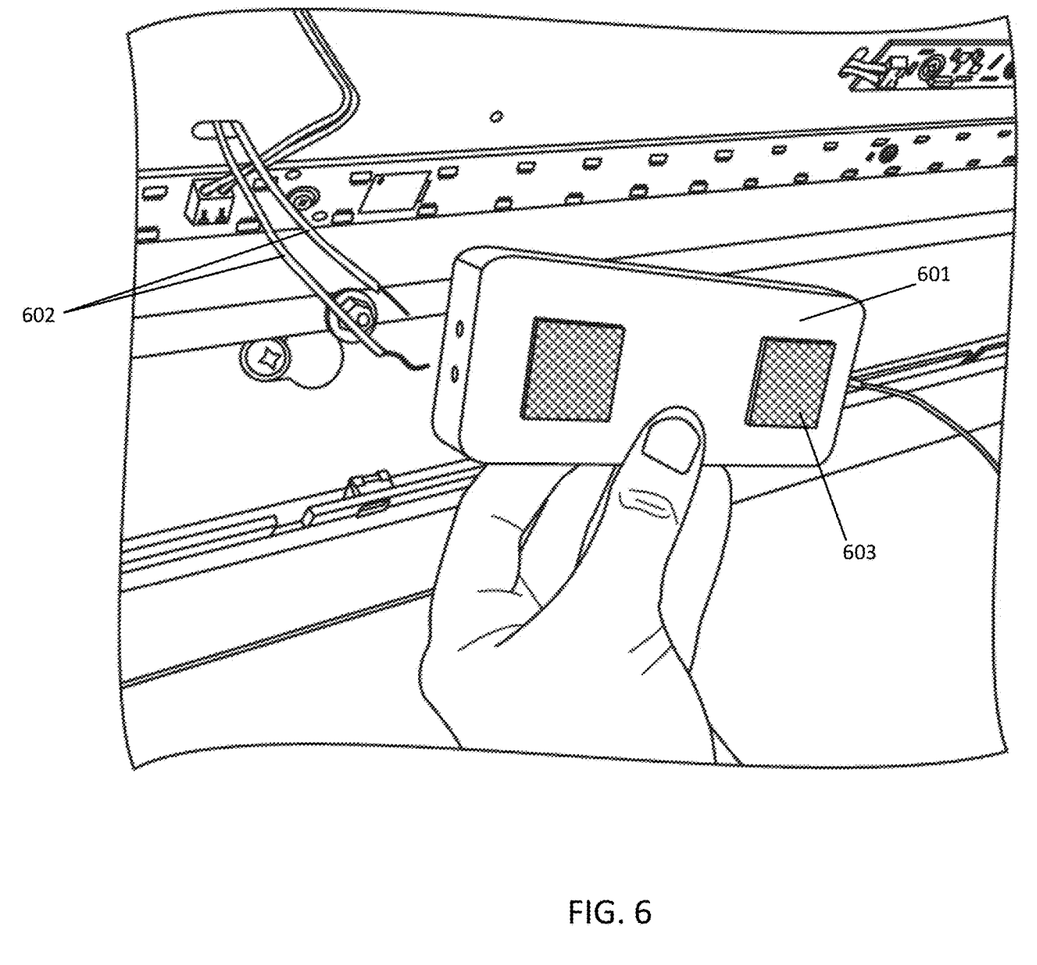
FIG. 6 depicts an illustrative example of an RF detector in relation to the interior of a light fixture.
Figure 7:
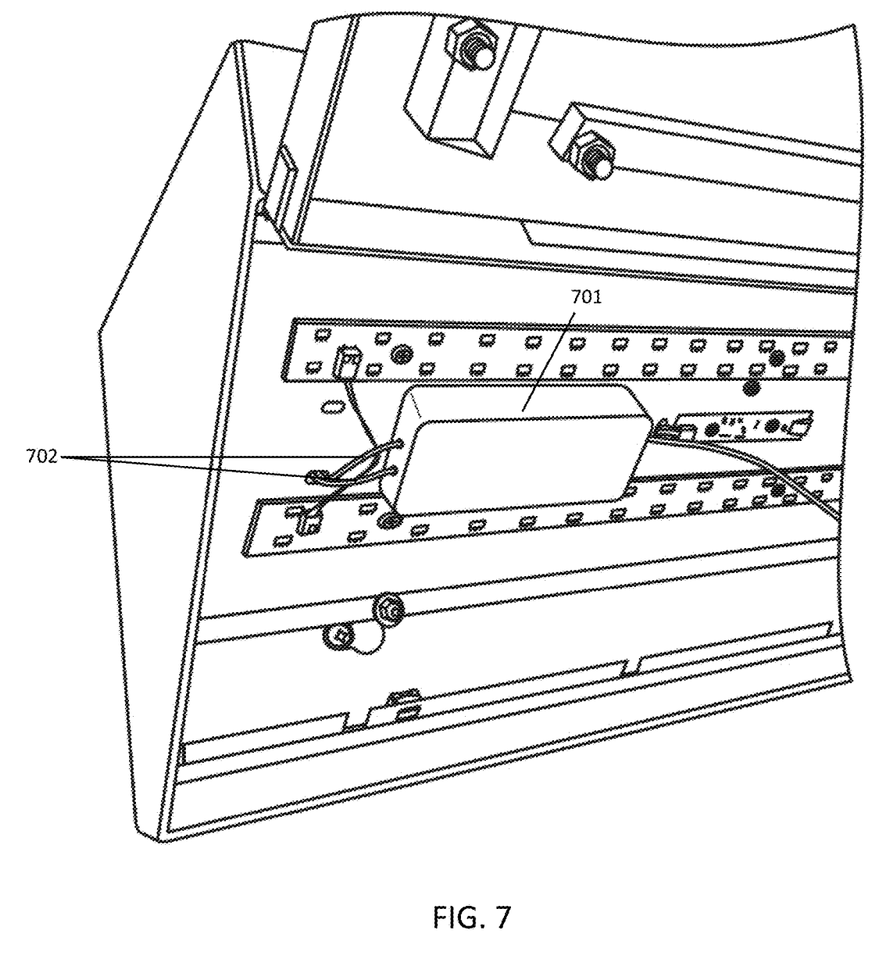
FIG. 7 depicts an illustrative example of an RF detector attached to the interior of a light fixture.

As shown in FIG. 6 the RF detector 601 may include a mounting system 603 (e.g., adhesive, hook and loop fasteners, magnets, etc.) in order to securely attach the RF detector within the securing lighting fixture. Also shown in FIG. 6 is the power supply circuit 602. As discussed herein, in some embodiments, the RF detector 601 may connect to the existing power system 602 within the securing lighting fixture. FIG. 7 shows an illustrative embodiment of the RF detector 701 being attached to the internal housing of the secure lighting fixture. In addition, FIG. 7 illustrates how the power source 702 of the lighting fixture may be utilized to power the RF detector 701.

Figure 8:
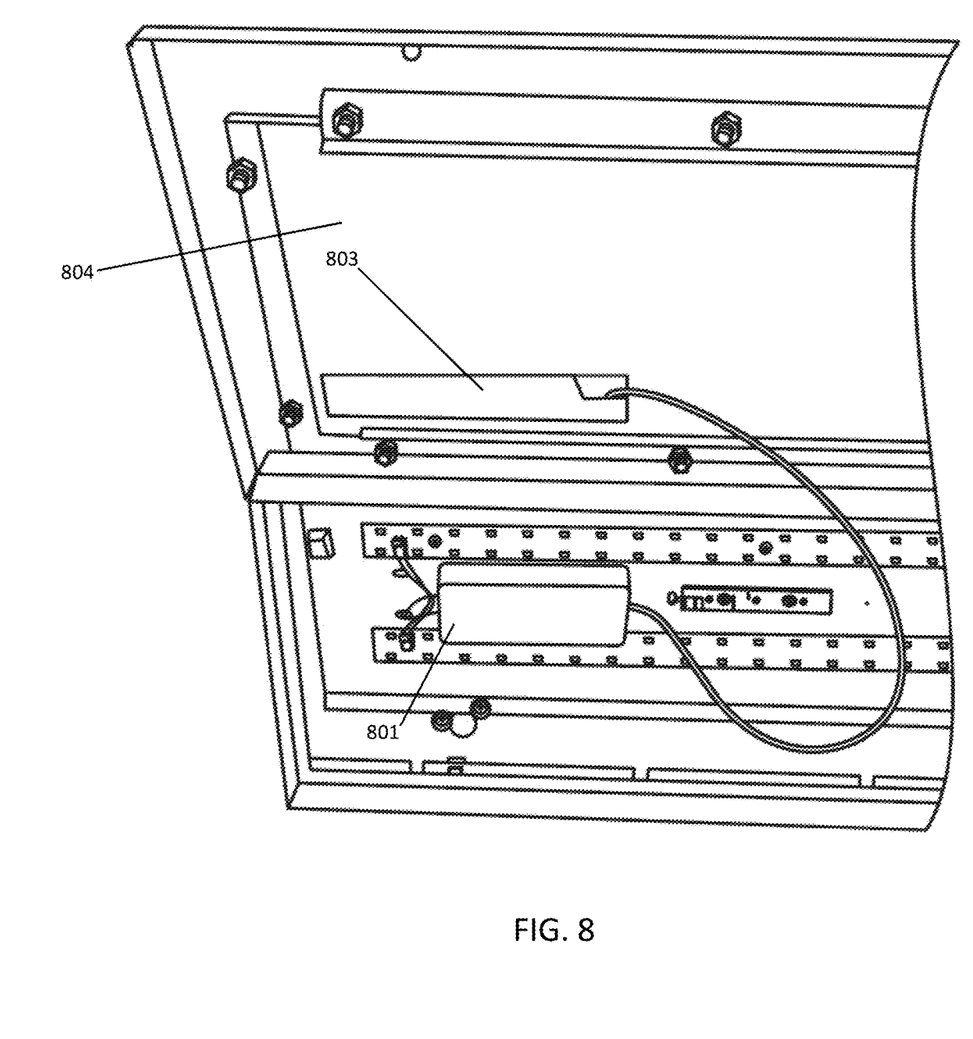
FIG. 8 depicts an illustrative example of an antenna attached to the lens of a light fixture.

In further embodiments, the large size of the lens of most illumination devices provides the ability to utilize a larger than typical antenna compared with general RF detection systems (e.g., those used for hand-held or installed RF surveillance devices). As shown in FIG. 8, the antenna 803 of the RF detector 801 can be placed remotely (e.g., directly on the lens 804 of the illumination device. The larger antenna results in increased signal strength and superior sensitivity, as well as a reduced cost of RF front-end electronics. One of the major advantages of installing the RF detector(s) in existing infrastructure is a lower cost achieved because of the use of a shared secure housing and reduced cost for the RF front end.

Thus, this reduced cost enables a higher density of RF detectors which increases efficacy of surveillance and reduced contraband retrieval time. In some further embodiments, the antenna of the system may be mounted on a transparent medial (e.g., a light fixture diffuser) in order to reduce any light reduction. In additional embodiments, the RF detector may be adhesively affixed to the illumination device lens for ease of installation. It may also be that the system is installed in an uniform location over the plurality of illumination devices to conceal its presence and purpose.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider).

The methods, systems, and computer program products are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
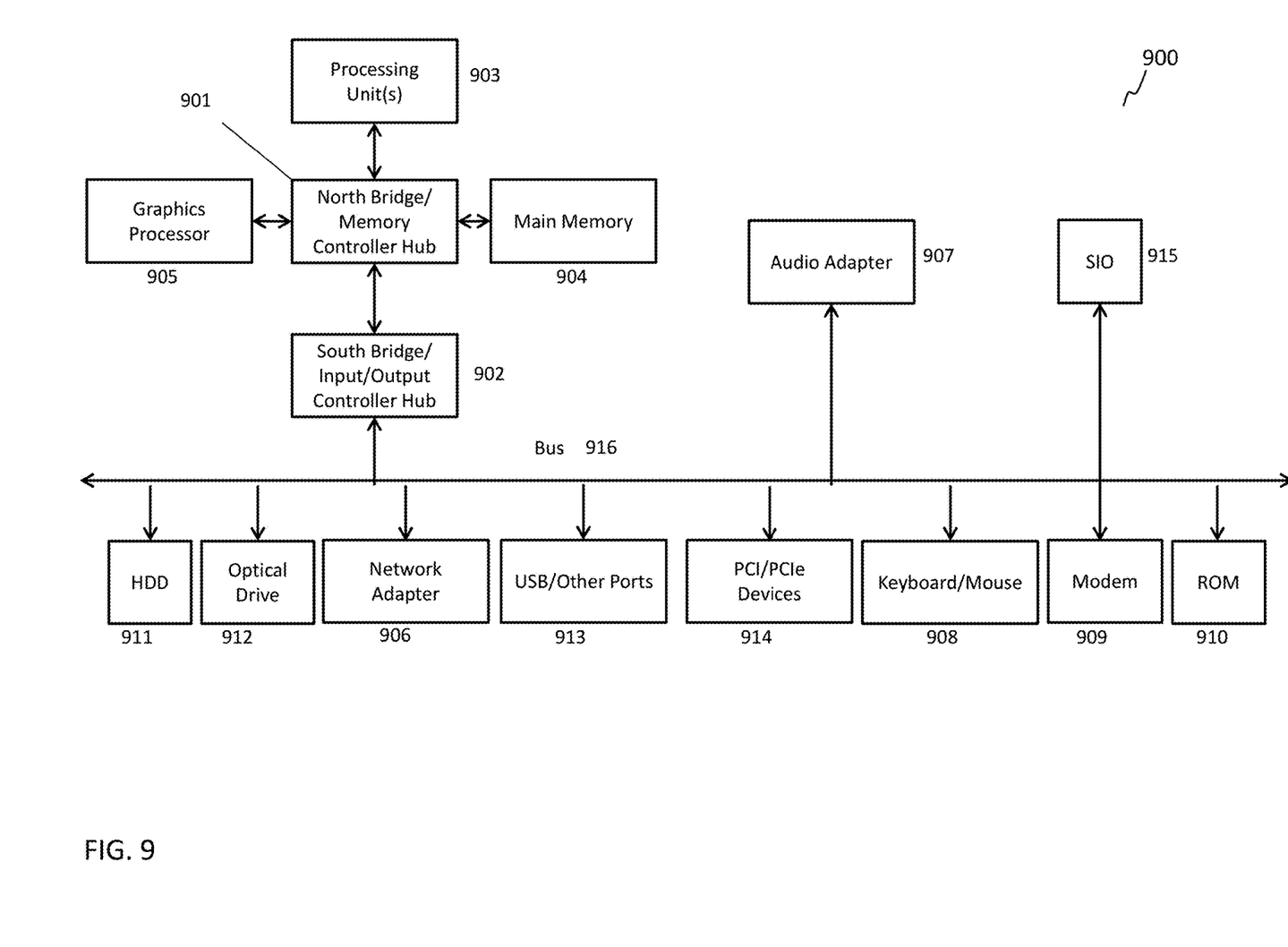
FIG. 9 depicts an illustrative computer system for monitoring cellular phone usage in a correctional facility

FIG. 9 is a block diagram of an illustrative data processing system 900 in which aspects of the illustrative embodiments are implemented. Data processing system 900 is an example of a computer, such as a server or client, in which computer usable code or instructions implementing the process for illustrative embodiments of the present invention are located. In some embodiments, the data processing system 900 may be a server computing device.

In the depicted example, data processing system 900 can employ a hub architecture including a north bridge and memory controller hub (NB/MCH) 901 and south bridge and input/output (I/O) controller hub (SB/ICH) 902. Processing unit 903, main memory 904, and graphics processor 905 can be connected to the NB/MCH 901. Graphics processor 905 can be connected to the NB/MCH 901 through, for example, an accelerated graphics port (AGP).

In the depicted example, a network adapter 906 connects to the SB/ICH 902. An audio adapter 907, keyboard and mouse adapter 908, modem 909, read only memory (ROM) 910, hard disk drive (HDD) 911, optical drive (e.g., CD or DVD) 912, universal serial bus (USB) ports and other communication ports 913, and PCI/PCIe devices 914 may connect to the SB/ICH 902 through bus system 916. PCI/PCIe devices 914 may include Ethernet adapters, add-in cards, and PC cards for notebook computers. ROM 910 may be, for example, a flash basic input/output system (BIOS). The HDD 911 and optical drive 912 can use an integrated drive electronics (IDE) or serial advanced technology attachment (SATA) interface. A super I/O (SIO) device 915 can be connected to the SB/ICH 902.

An operating system can run on processing unit 903. The operating system can coordinate and provide control of various components within the data processing system 900. As a client, the operating system can be a commercially available operating system. An object-oriented programming system, such as the Java™ programming system, may run in conjunction with the operating system and provide calls to the operating system from the object-oriented programs or applications executing on the data processing system 900. As a server, the data processing system 900 can be an IBM® eServer™ System P® running the Advanced Interactive Executive operating system or the Linux operating system. The data processing system 900 can be a symmetric multiprocessor (SMP) system that can include a plurality of processors in the processing unit 903. Alternatively, a single processor system may be employed.

Instructions for the operating system, the object-oriented programming system, and applications or programs are located on storage devices, such as the HDD 911, and are loaded into the main memory 904 for execution by the processing unit 903. The processes for embodiments described herein can be performed by the processing unit 903 using computer usable program code, which can be located in a memory such as, for example, main memory 904, ROM 910, or in one or more peripheral devices.

A bus system 916 can be comprised of one or more busses. The bus system 916 can be implemented using any type of communication fabric or architecture that can provide for a transfer of data between different components or devices attached to the fabric or architecture. A communication unit such as the modem 909 or the network adapter 906 can include one or more devices that can be used to transmit and receive data.

Those of ordinary skill in the art will appreciate that the hardware depicted in FIG. 9 may vary depending on the implementation. Other internal hardware or peripheral devices, such as flash memory, equivalent non-volatile memory, or optical disk drives may be used in addition to or in place of the hardware depicted. Moreover, the data processing system 900 can take the form of any of a number of different data processing systems, including but not limited to, client computing devices, server computing devices, tablet computers, laptop computers, telephone or other communication devices, personal digital assistants, and the like. Essentially, data processing system 900 can be any known or later developed data processing system without architectural limitation.

Figure 10:
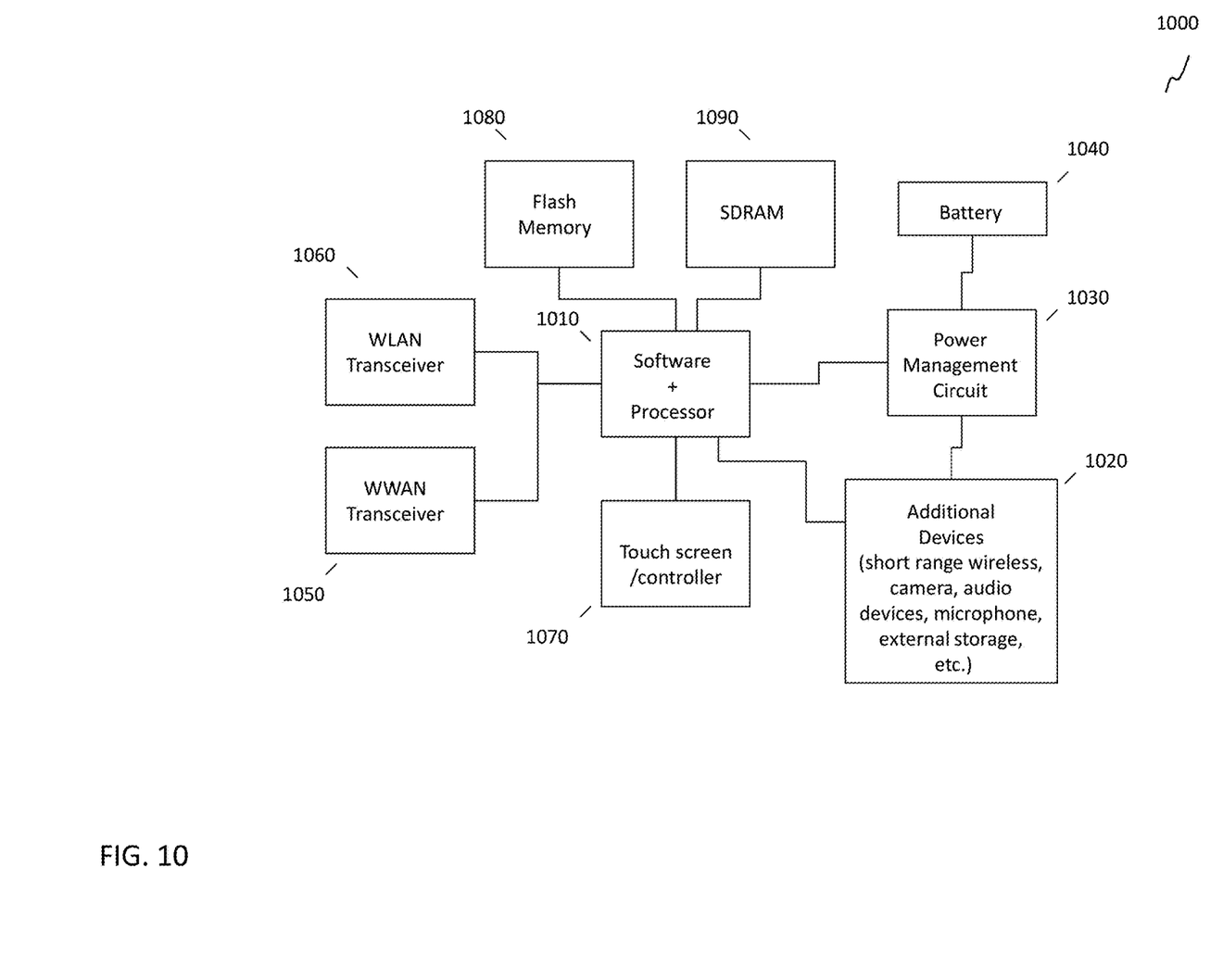
FIG. 10 depicts a mobile system for monitoring cellular phone usage in a correctional facility.

While various other circuits, circuitry or components may be utilized in information handling devices, with regard to smart phone and/or tablet-like circuitry 1000, an example illustrated in FIG. 10 includes a system on a chip design found for example in tablet or other mobile computing platforms. Software and processor(s) are combined in a single chip 1010. Processors comprise internal arithmetic units, registers, cache memory, busses, I/O ports, etc., as is well known in the art. Internal busses and the like depend on different vendors, but essentially all the peripheral devices (1020) may attach to a single chip 1010. The circuitry 1000 combines the processor, memory control, and I/O controller hub all into a single chip 1010. Also, systems 1000 of this type do not typically use SATA or PCI or LPC. Common interfaces, for example, include SDIO and I2C.

There are power management chip(s) 1030, e.g., a battery management unit, BMU, which manage power as supplied, for example, via a rechargeable battery 1040, which may be recharged by a connection to a power source (not shown). In at least one design, a single chip, such as 1010, is used to supply BIOS like functionality and DRAM memory.

System 1000 typically includes one or more of a WWAN transceiver 1050 and a WLAN transceiver 1060 for connecting to various networks, such as telecommunications networks and wireless Internet devices, e.g., access points. Additionally, devices 1020 are commonly included. System 1000 may include a touch screen 1070 for data input and display/rendering, e.g., including provisioning of a soft keyboard. System 1000 also typically includes various memory devices, for example flash memory 1080 and SDRAM 1090.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the disclosure has been described with reference to exemplary embodiments, it is not limited thereto. Those skilled in the art will appreciate that numerous changes and modifications may be made to the embodiments described herein and that such changes and modifications may be made without departing from the true spirit of the disclosure. It is therefore intended that the appended claims be construed to cover all such equivalent variations as fall within the true spirit and scope of the disclosure.

What is claimed is:

1. A system comprising:
   a lighting fixture comprising:
   a housing;
   at least one light source disposed within the housing; and
   at least one power connection operatively coupled to the at least one light source; and
   a radio frequency detection device operatively coupled to the at least one power connection and disposed within the housing, the radio frequency detection device comprising:
   at least one processor; and
   at least one computer readable storage medium in communication with the at least one processor, wherein the computer readable storage medium contains one or more programming instructions that, when executed by the at least one processor, cause the radio frequency detection device to:
   broadcast a periodic heartbeat signal configured to facilitate determination as to whether the radio frequency detection device has been tampered with or disabled;
   detect a radio frequency signal emitted by a mobile device; and
   responsive to the detection of the radio frequency signal:
   extract identification data for the mobile device from the radio frequency signal, wherein the identification data comprises at least one of an International Mobile Equipment Identity (IMEI) number of the mobile device or a subscriber identification module (SIM) card identification number of the mobile device; and
   transmit a notification message to a user device, based on a proximity of the user device to a location of the radio frequency detection device, to thereby alert a user of the user device of unauthorized use of the mobile device, wherein the notification message comprises the identification data, and wherein the user device is external to a mesh network that includes the radio frequency detection device and the identification data uniquely identifies the mobile device.

2. The system of claim 1, wherein the radio frequency detection device comprises a power wake-up circuit.

3. The system of claim 1, further comprising a plurality of lighting fixtures and wherein the radiofrequency detection device comprises one of a plurality of radio frequency detection devices and the one or more programming instructions, when executed by the at least one processor, further cause the radio frequency detection device to broadcast the periodic heartbeat signal to each other of the plurality of radio frequency devices.

4. The system of claim 3, wherein each of the plurality of radio frequency detection devices comprise a wireless network adapter.

5. The system of claim 4, wherein the plurality of radio frequency detection devices are deployed in a mesh network and each of the plurality of radio frequency detection devices is configured to communicate via the mesh network using the wireless network adapter and at least one of a flooding technique or a routing technique.

6. The system of claim 5, wherein the one or more programming instructions, when executed by the at least one processor, further cause the radio frequency detection device to:
detect a failure in another of the plurality of radio frequency detection devices; and
responsive to the detection of the failure, self-heal the mesh network.

7. The system of claim 1, wherein the user device comprises at least one of a central server or another mobile device.

8. A radio frequency detection device comprising:
at least one processor; and
at least one computer readable storage medium in communication with the at least one processor, wherein the computer readable storage medium contains one or more programming instructions that, when executed by the at least one processor, cause the radio frequency detection device to:
broadcast a periodic heartbeat signal configured to facilitate determination as to whether the radio frequency detection device has been tampered with or disabled;
detect a radio frequency signal emitted by a mobile device; and
responsive to the detection of the radio frequency signal:
extract identification data for the mobile device from the radio frequency signal, wherein the identification data comprises at least one of an International Mobile Equipment Identity (IMEI) number of the mobile device or a subscriber identification module (SIM) card identification number of the mobile device; and
transmit a notification message to a user device, based on a proximity of the user device to a location of the radio frequency detection device, to thereby alert a user of the user device of unauthorized use of the mobile device, wherein the notification message comprises the identification data, and wherein the user device is external to a mesh network that includes the radio frequency detection device and the identification data uniquely identifies the mobile device; and
wherein the radio frequency detection device is configured to be disposed within a housing of a light fixture and to connect to an existing light source power connection within the housing without being operatively connected to the light source.

9. The radio frequency detection device of claim 8, wherein the radio frequency detection device comprises a power wake-up circuit.

10. The radio frequency detection device of claim 8, wherein the radio frequency detection device comprises one of a plurality of radio frequency detection devices that collectively comprise a mesh network.

11. The radio frequency detection device of claim 10, further comprising a wireless network adapter.

12. The radio frequency detection device of claim 11, wherein the radio frequency detection device is configured to communicate via the mesh network using the wireless network adapter.

13. The radio frequency detection device of claim 12, wherein the radio frequency detection device is configured to communicate via the mesh network using at least one of a flooding technique or a routing technique.

14. The radio frequency detection device of claim 10, wherein the one or more programming instructions, when executed by the at least one processor, further cause the radio frequency detection device to:
detect a failure in another of the plurality of radio frequency detection devices; and
responsive to the detection of the failure, self-heal the mesh network.

15. The radio frequency detection device of claim 8, wherein the user device comprises at least one of a central server or another mobile device.

16. A light fixture housing comprising:
a light source;
at least one power connection; and
a radio frequency detection device operatively coupled to the at least one power connection and comprising:
at least one antenna;
at least one processor operatively coupled to the at least one antenna; and
at least one computer readable storage medium in operable communication with the at least one processor, wherein the computer-readable storage medium contains one or more programming instructions that, when executed by the at least one processor, cause the at least one processor to:
detect, using the at least one antenna, that at least one mobile device is attempting to transmit to a third party network;
capture, using the processor, identification information associated with the at least one mobile device, wherein the identification information comprises at least one of or a subscriber identification module (SIM) card identification number of the at least one mobile device;
transmit the identification information to one or more user devices, based on a proximity of the one or more user devices to a location of the radio frequency detection device, to thereby alert one or more users of the one or more user devices of unauthorized use of the at least one mobile device, wherein the notification message comprises the identification information, and wherein the user device is external to a mesh network that includes the radio frequency detection device and the identification data uniquely identifies the mobile device; and
broadcast a periodic heartbeat signal configured to facilitate determination as to whether the radio frequency detection device has been tampered with or disabled.

17. The light fixture housing of claim 16, wherein the one or more programming instructions, when executed by the at least one processor, further cause the at least one processor to:
detect a failure in another of a plurality of radio frequency detection devices deployed in a mesh network with the radio frequency detection device; and
responsive to the detection of a the failure, self-heal the mesh network.

18. The light fixture housing of claim 16, wherein the user device comprises at least one of a central server or another mobile device.

* * * * *